United States Patent [19]
Ohtaki et al.

[11] 4,126,877
[45] Nov. 21, 1978

[54] SAFETY DEVICE FOR AN EXPOSURE AMOUNT CONTROL EQUIPMENT

[75] Inventors: Syohei Ohtaki, Yokohama; Zenzo Nakamura, Urawa; Tokuichi Tsunekawa; Tadashi Ito, both of Yokohama; Hiroshi Aizawa, Machida; Takashi Uchiyama, Yokohama, all of Japan

[73] Assignee: Canon Kabushiki Kaisha, Tokyo, Japan

[21] Appl. No.: 673,053

[22] Filed: Apr. 2, 1976

[30] Foreign Application Priority Data

Apr. 9, 1975 [JP] Japan .................................. 50-43104

[51] Int. Cl.² ........................ G03B 15/05; G03B 17/38
[52] U.S. Cl. .................................... 354/149; 354/152; 354/267; 354/60 R
[58] Field of Search ................. 354/33, 34, 60 F, 126, 354/133, 139, 149, 145, 60 R, 267, 269, 152; 315/241 P

[56] References Cited
U.S. PATENT DOCUMENTS

| | | | |
|---|---|---|---|
| 3,439,597 | 4/1969 | Wagner | 354/139 |
| 3,535,991 | 10/1970 | Kitai | 354/60 F X |
| 3,706,266 | 12/1972 | Uno et al. | 354/145 X |
| 3,723,810 | 3/1973 | Mashimo | 354/145 X |
| 3,953,864 | 4/1976 | Iwata et al. | 354/139 X |
| 3,971,049 | 7/1976 | Ohmuri et al. | 354/60 F X |

*Primary Examiner*—Michael L. Gellner
*Attorney, Agent, or Firm*—Toren, McGeady and Stanger

[57] ABSTRACT

The present invention relates to a safety device for exposure amount control equipment consisting of a camera and an electronic flash device, including a detecting circuit for detecting the charge voltage of the storage capacitor of the electronic flash device and the voltage of the power source and producing two different electrical signals in accordance with the detected voltages so as to prevent flash light photography with improper exposure amount and a lock member for preventing the movement of a shutter release mechanism of the camera in accordance with the electrical signal produced in the detecting circuit when the detected voltages are lower than a certain determined value.

9 Claims, 8 Drawing Figures

SAFETY DEVICE FOR AN EXPOSURE AMOUNT CONTROL EQUIPMENT

BACKGROUND OF THE INVENTION

The present invention relates to a safety device for the exposure amount control device, particularly for the exposure amount control device consisting of a camera and an electronic flash device.

Until now flash light photography has been carried out when the object is in darkness. When the electronic flash device is not connected with the current source, or a sufficient output voltage is not maintained even if the electronic flash device is connected with the current source or the flash light device has been repeatedly discharged, the flash light device does not operate or sufficient flash light is not produced when the flash light tube is triggered. p Thus, there exists the shortcoming that when flash light photography is started before a sufficient electrical energy is stored in the storage capacitor, the picture is taken with underexposure so as to cause a waste of film.

Thus, a Japanese Patent Publication Sho 48-6484 has proposed a safety device for the exposure amount control equipment which is so designed that the charge voltage of the storage capacitor of the electronic flash device is detected in such a manner that only when the charge voltage has reached a certain determined value, the shutter is allowed to operate, eliminating the above mentioned shortcoming of the conventional device. However, when the system disclosed in the publication, the shutter is not allowed to operate when the charge voltage of the storage capaciter is lower than a certain determined value so that the improper exposure, namely the waste of film is impossible. On the other hand, every time the flash light photography is started before the charge voltage of the storage capacitor has reached a certain determined value, it is essential to bring various actuated mechanisms such as the mirror driving mechanism, the diaphragm mechanism and so on into the initial state before the shutter release button is pushed down in order to take the next picture. This is inconvenient and the operability is inferior.

SUMMARY OF THE INVENTION

A purpose of the present invention is to offer a safety device with superior operability for the exposure amount control equipment, being capable of preventing the waste of film at the time of flash light photography.

Another purpose of the present invention is to offer a safety device for a single reflex camera.

Other purposes of the present invention will be disclosed by means of the detailed explanations to be made below in accordance with the drawings of the embodiments.

DESCRIPTION OF THE PREFERRED EMBODIMENTS

Figure 1:
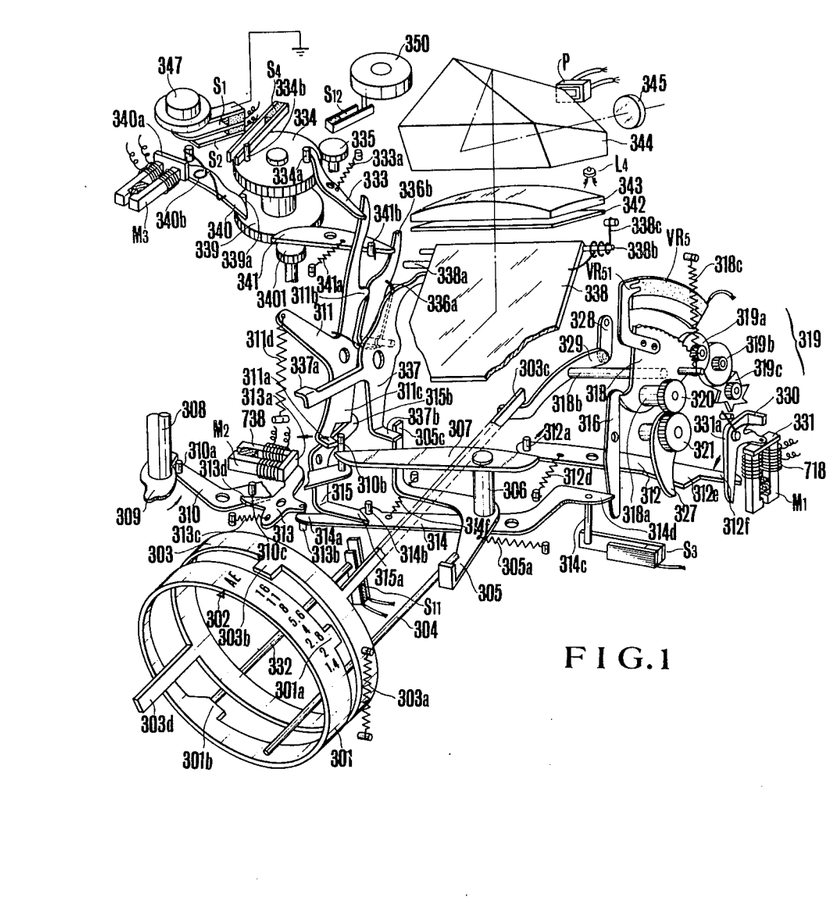
FIG. 1 shows important parts of an embodiment of the camera in which the device in accordance with the present invention is adopted.

FIG. 1 shows the important parts of the camera in which the device in accordance with the present invention is adopted, whereby the film has been wound up while the shutter has also been charged.

In FIG. 1, 301 is the aperture ring, which is provided with the automatic aperture index AE and the manual aperture index as well as with the projecting part 301a and the cam part 301b. 302 is the index for matching the automatic aperture index AE with the manual aperture index. 303 is the aperture preset ring forming a part of the diaphragm mechanism, which aperture preset ring is urged in clockwise direction by means of a spring 303a, presenting a projecting part 303b engageable with the projecting part 301 of the aperture ring forming a part of the diaphragm mechanism. Further, the preset ring 303 is provided with the arm 303c, being intended to determine the rotation amount of the bell crank by means of the lever 303d through the aperture set cam ring (not shown in the drawing) forming a part of the diaphragm mechanism in such a manner that the bell crank controls the rotation of the diaphragm driving ring (not shown in the drawing) so as to determine the opening degree of the diaphragm. 304 is a pin provided on the above mentioned diaphragm driving ring, whereby the end of the pin 304 is engaged with the automatic aperture lever 305 urged in the counter-clockwise direction by means of the spring 305a. The automatic aperture lever 305 presents a rising up part 305c. Further the automatic aperture lever 305 is provided with the intermediary lever 307 coaxially to the shaft 306. 308 is the shaft of the winding up lever (not shown in the drawing), whereby the winding up cam 309 is fixed on the end surface of the winding up shaft 308. 310 is a rotatable intermediary lever, whereby the pin 310a provided at the one end of the intermediary lever 310 is engaged with the winding up cam 309. The other end of the intermediary lever 310 is provided with the pin 310b in such a manner that the pin 310b is engaged with the one end of the above mentioned intermediary lever 307 as well as with the one end 311a of the mirror driving lever 311. Further the first holding lever 313 is charged by means of the pin 310c provided on the intermediary lever 310. The other end of the intermediary lever 307 is engageable with the pin 312a provided at the one end of the rotatable charge lever 312. This charge lever 312 is urged in the counter-clockwise direction by means of the spring 312d. $M_2$ is the first holding magnet with permanent magnet for electromagnetically controlling the shutter release mechanism, being engaged with the one end 313a of the first holding lever 313, while the pin 313b provided at the other end is engaged with the one end 314a of the release lever 314 forming a part of the shutter release mechanism. This lever 313 is urged in the clockwise direction by means of the spring 313c. Further it is so designed that when the lever 310 is rotated in the clockwise direction, the pin 310c rotates the lever 313 in the counterclockwise direction by means of the one end 313d of the lever 313 against the force of the spring 313c. This release lever 314 is mechanically linked with the exposure control mechanism consisting of the shutter mechanism, the diaphragm mechanism and so on, whereby at the one end of the release lever 314 a pin 314b is provided, at which pin the other end 315a of the mirror driving engagement lever 315 is kept, whose one end 315b is engaged with the one side 311c of the mirror driving lever 311. Further at the end 314d of the release lever 314 the one end of the rotatable AE holding lever 316 is kept. Further at the other end of the release lever 314 a pin 314c is provided so as to hold the movable contact piece of the memory switch $S_3$. This release lever 314 is urged in the clockwise direction by means of the spring 314f. Further the force of the spring 314f is choosen weaker than that of the spring 313c. 318 is the AE sector gear being kept at the other end of the holding lever 316. With this sector gear 318 the gears 319a, 319b and the stop wheel 319c forming the speed control mechanism 319 are engaged. Further the sliding piece VR51 of the variable resistance VR5 for determining the aperture preset value is provided at the sector gear 318. The gear 320 is mounted on the shaft 318a of the sector gear 318 while the AE charge gear 321 is engaged with the gear 320. The lever 327 is mounted coaxially with the gear 321, while the lever 327 is in contact with the other end 312e of the above mentioned charge lever 312. The pin 318b is provided on the above mentioned sector gear 318, whereby the end surface of the pin 318b is fixed on the signal lever 329 pivoted on the support lever 328. The folded end of the signal lever 329 is holds the arm 303c of the above mentioned aperture preset ring 303. The above mentioned AE sector gear 318 is strongly urged in the clockwise direction by means of the spring 303a against the force of the spring 318c urged in the counter-clockwise direction on the sector gear 318. $M_2$ is the control magnet with permanent magnet, whereby when the magnet $M_1$ is excited, the force of the permanent magnet is cancelled with that of the excited magnet while when the magnet $M_1$ is not excited, the force of the permanent magnet is effective. The same thing can be said of the above mentioned magnet $M_2$ and the magnet $M_3$ to be explained later. Thus when the magnet $M_1$ is not excited, the permanent magnet is in a position to attract the iron piece 331 provided on the attracted lever 330. The attracted lever 330 is urged in the counter-clockwise direction by means of the spring, whereby the folded end of the lever 330 is engageable with the stop wheel 319c of the above mentioned speed control mechanism 319. Further the stepped part 312f at the other end of the charge lever 312 is in contact with the other end of the attracted lever 330. The pin 332 in contact with the movable contact piece of the manual-auto change over switch $S_{11}$ is provided at the side of the lens, whereby the end surface of the pin 332 is in contact with the cam part 301b of the above mentioned aperture ring 301. The above mentioned mirror driving lever 311 presents a delay device (not shown in the drawing), being urged in the counter-clockwise direction by means of the spring 311d, whereby the mirror driving lever 311 is provided at such a position at which the one end of the lever 311 is held by the other end 315b of the above mentioned mirror driving engagement lever 315 while the other end is engaged with the one end of the front shutter plane holding lever 333. The front shutter plane holding lever 333 is urged in the counter-clockwise direction by the spring 333a while the end of the lever 333 is engaged with the pin 334a provided on the front shutter plane gear 332 forming a shutter mechanism. Further a pin 334b is provided on the front shutter plane gear 334, being engaged with the count starting switch $S_4$. The front shutter plane gear 334 is engaged with the front shutter plane pinion 335 of the front shutter plane drum not shown in the drawing. Further the mirror holding lever 336 is held at the holding part 311b of the above mentioned mirror driving lever 311. This holding lever 336 is urged in the counter-clockwise direction by means of a spring 336a provided between the holding lever 336 and the mirror driving lever 311, whereby the one end of the lever 336 is engaged with the push up lever 337 provided coaxially with the mirror driving lever 311. The push up lever 337 is so designed that the lever 337 is rotated in the clockwise direction by means of the mirror raising up operation from outside so as to raise the mirror by means of the one end 337a. The other end of the push up lever 337 is kept at the push up pin 338a provided at the mirror 338. The mirror 338 is rotatable around the mirror shaft 338b. 338c is the mirror return spring.

339 is the rear shutter plane provided separately from the above mentioned front shutter plane gear 334 but coaxially with the gear 334 forming a part of the shutter mechanism, being engaged with the rear shutter plane pinion 340 for the rear shutter plane drum not shown in the drawing. Further the rear shutter plane gear 339 is provided with the pin 339a. 340 is the attracted lever to be rotated by the above mentioned pin 339a, so designed as to be attracted by the shutter control magnet with permanent magnet $M_3$ with the iron piece 340a. The attracted lever 340 is normally urged by the spring 340b so as to be rotated and held by the magnet $M_3$. 341 is the rear shutter plane signal lever to be rotated by the above mentioned pin 339a, being normally rotated up to the position of the holding pin 341b by means of the spring 341a. The end 336b of the above mentioned mirror holding lever 336 is held at the above mentioned rear shutter plane signal lever 341. The light beam passing through the photographic lens not shown in the drawing is seen by the photographer by means of the eye piece 345 through the mirror 338, the focal plane 342, the condenser lens 343 and the pentagonal prism in sequence. P is a light sensing element such as photovoltaic element. 347 is the shutter button by means of whose first stroke the switch $S_1$ is closed and by means of whose second stroke the switch $S_2$ is closed. $L_4$ is an illuminating diode for indicating the operation of the misoperation prevention circuit, being provided at one part of the view finder system. 350 is the shutter time setting dial, whereby the normally opened switch $S_{12}$ is closed by setting the dial 350 at "B".

Figure 2:
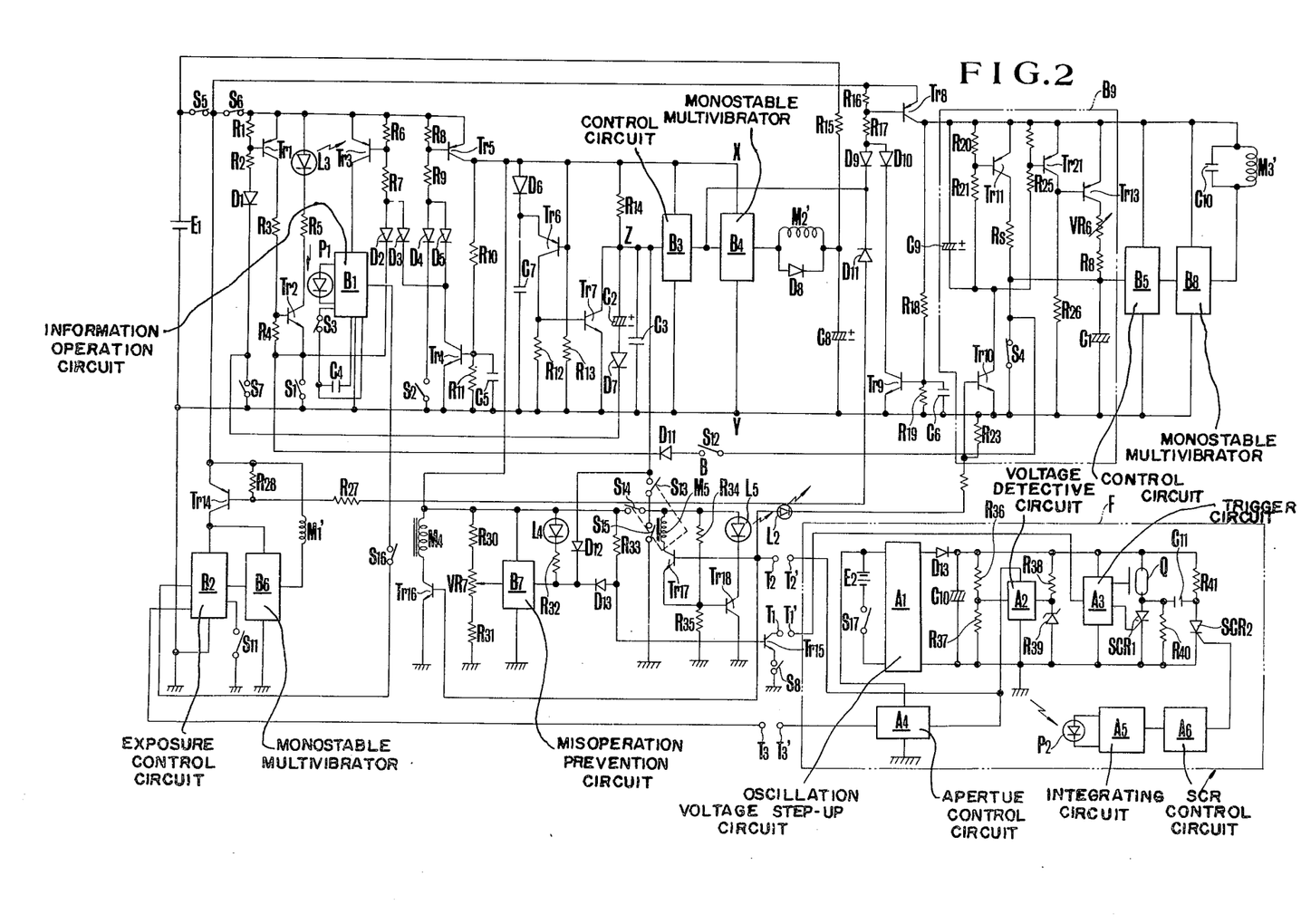
FIG. 2 shows the electrical circuit of the camera shown in FIG. 1 and that of the flash light device in which the device in accordance with the present invention is adopted.

FIG. 2 shows the exposure control circuit of the camera and the electrical circuit of the flash light device in which the device in accordance with the present invention is adopted.

Figure 3:
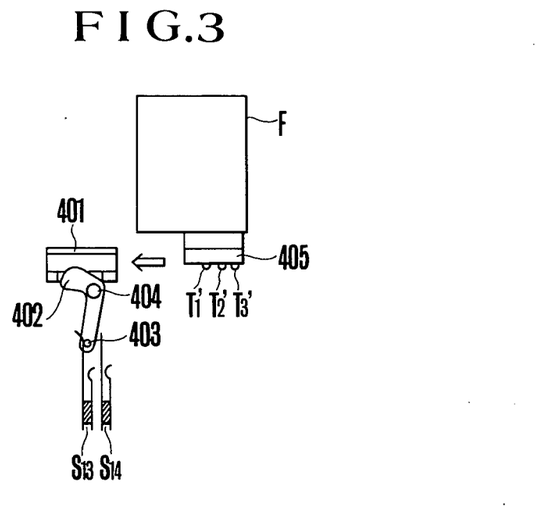
FIG. 3 shows the montage of a flash light device on the camera shown in FIGS. 1 and 2.
Figure 4:
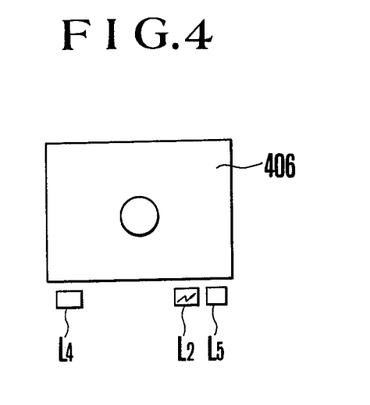
FIG. 4 shows an embodiment of the view finder of the camera shown in FIG. 1.

$S_1$, $S_2$, $S_3$, $S_4$, $S_{11}$, $S_{12}$ and $L_4$ shown in FIG. 2 are respectively the switches and the illuminating element in FIG. 1, $S_{13}$ and $S_{14}$ in FIG. 2 are the switches in FIG. 3, $L_5$ in FIG. 2 is the alarm illuminating element in FIG. 4, while $M'_3$, $M'_2$ and $M'_1$ are the exciting coils of the magnets $M_3$, $M_2$ and $M_1$.

In FIG. 2, $E_1$ is the current source for the exposure control at the side of the camera, whereby with the current source $E_1$, the information operation circuit $B_1$, the exciting coil $M'_2$, the control circuit $B_3$ consisting of the Schmidt circuit, the mono-stable multi-vibrator circuit $B_4$ and the misoperation prevention circuit $B_7$ are connected parallel to each other through the normally closed switch $S_6$ to be opened in functional engagement with the front shutter plane and the normally closed switch $S_5$ to be opened in functionally engagement with the rear shutter plane. Further with the current source $E_1$ the exciting coil $M'_1$, the control circuit $B_2$, the mono-stable multi-vibrator circuit $B_6$, the exciting coil $M'_3$, the control circuit $B_6$ consisting of a Schmidt circuit, and the mono-stable vibrator circuit $B_8$ are connected parallel to each other through the above mentioned switch $S_5$. The control circuit $B_2$ presents the above mentioned variable resistance $VR_5$, whereby when the value of the resistance reaches a certain determined level, the control circuit $B_2$ is closed.

Below the information operation circuit $B_1$, the exposure control circuit $B_2$ and the misoperation prevention circuit $B_7$ will be explained in detail in accordance with the drawings shown in FIGS. 5 to 8.

Figure 5:
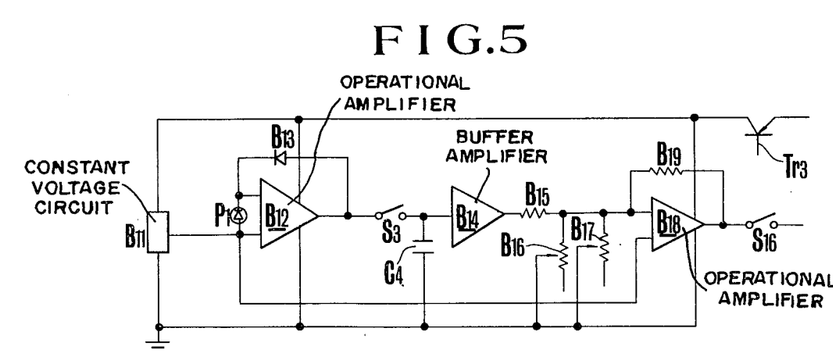
FIG. 5 shows the information operation circuit of the exposure amount control device shown in FIG. 2, in detail.
Figure 7:
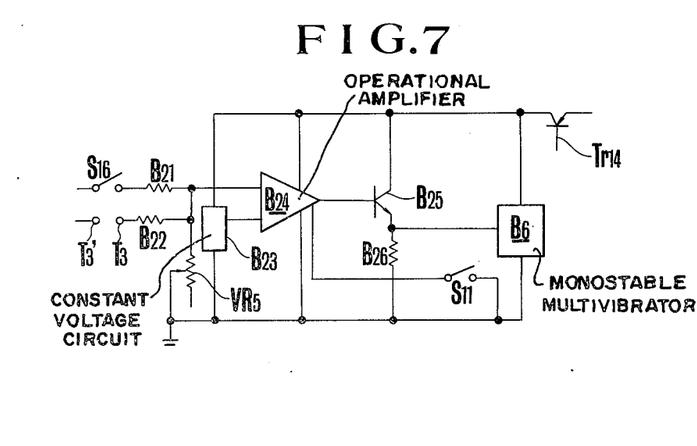
FIG. 7 shows the exposure control circuit of the exposure amount control device shown in FIG. 2, in detail.

As is shown in FIG. 5, the operation circuit $B_1$ consists of $B_{11}$–$B_{19}$, whereby the operational amplifier $B_{12}$ to whose one input terminal the output voltage of the constant voltage circuit $B_{11}$ is applied compresses the output signal of the light-sensitive element $P_1$ logarithmically by means of the diode 13 so as to produce an output at the output terminal in such a manner that the produced output signal is stored in the memory condenser $C_4$ through the above mentioned switch S3. The information stored in the condenser $C_4$ corresponding to the brightness of the object to be photographed is put in the operational amplifier $B_{18}$ through the buffer amplifier $B_{14}$ and the resistance $B_{15}$. The amplifier $B_{18}$ operates the film sensitivity information set at the resistance $B_{16}$, the shutter time information set at the resistance $B_{17}$ mechanically linked with the dial 350 and the object brightness information so as to produce the aperture information at the output terminal. As is shown in FIG. 7, the exposure control circuit $B_2$ consists of the elements $B_{12}$–$B_{26}$, whereby when the aperture information is applied to the one input terminal of the operational amplifier $B_{24}$ through the switch $S_{16}$ and the resistance $B_{21}$, the amplifier $B_{24}$ brings the npn transistor $B_{25}$ into the switched on state, when the value of the above mentioned variable resistance $VR_5$ reaches a certain determined value, so as to trigger the mono-stable multi-vibrator circuit. Also when the aperture information is put in the input terminal of the operational amplifier $B_{24}$ through the terminal $T_3$ and the resistance $B_{22}$, the operational amplifier $B_{24}$ brings the transister into the switched on state, when the value of the variable resistance $VR_5$ reaches a certain determined value, so as to trigger the mono-stable multi-vibrator circuit. Hereby $B_{23}$ is a constant voltage circuit, $B_{26}$ the resistance, $S_{11}$ the above mentioned switch, whereby the one end of the switch $S_{11}$ is connected to the terminal for controlling the operation and the non-operation of the amplifier $B_{24}$.

Figure 8:
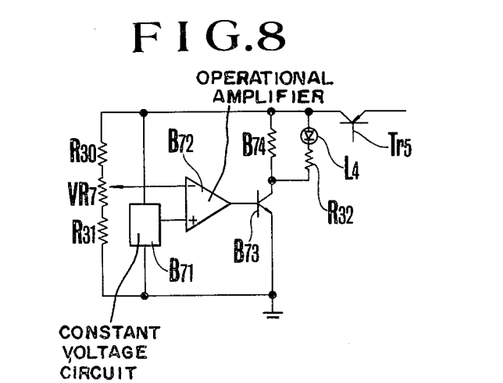
FIG. 8 shows the induction prevention circuit of the exposure amount control device shown in FIG. 2, in detail.

As is shown in FIG. 8, the misoperation prevention circuit $B_7$ consists of the elements $B_{71}$–$B_{74}$, whereby when the voltage of the current source $E_1$ is below a certain determined value, the operational amplifier $B_{72}$ brings the npn transistor $B_{73}$ into the switched on state so as to light the diode $L_4$. Hereby $B_{71}$ is a voltage constant circuit while $B_{74}$ the resistance.

$R_1$ and $R_2$ are the voltage dividing resistances, $D_1$ the non-return diode, and $S_7$ the switch for self-timer, whereby the base of the transister $Tr_1$ is connected to the voltage dividing point of the voltage dividing resistances $R_1$ and $R_2$. $Tr_2$ is the diode driving transister whose base is connected to the voltage dividing point of the voltage dividing resistance $R_3$ connected to the collector of the transister $Tr_1$ and of the voltage dividing resistance $R_4$ and in whose collector circuit the resistance $R_5$ and the illuminating diode $L_3$ for indicating the self-timer setting, whereby in the emitter circuit of the transistor $Tr_2$ the above mentioned switch $S_1$ is connected. $C_4$ is the memory condenser connected in the memory circuit of the above mentioned operation circuit $B_1$, and $S_3$ the memory holding switch. The switch $S_3$ is connected in the light measuring circuit presenting the light sensing element $P_1$ at the side of the camera in the operation circuit $B_1$ and the memory circuit so that the object brightness value immediately before the raise of the mirror 338 is stored in the memory condenser $C_4$ as an electrical signal. $Tr_3$ is a transister with the current supply control switching function for supplying current to the operation circuit $B_1$, whereby the base of the transister $Tr_3$ is connected to the voltage dividing point of the voltage dividing resistances $R_6$ and $R_7$, being connected to the above mentioned switch $S_1$ and the collector of the transistor $Tr_4$ through the non-return diode $D_2$ and $D_3$ connected parallel to each other. Further $Tr_5$ is a transister with the current supply control switching function for supplying current to the exciting coil $M'_2$, the control circuit $B_3$ and the mono-stable multi-vibrator circuit $B_4$, whereby the base of the transister $Tr_5$ is connected to the voltage dividing point of the voltage dividing resistances $R_8$ and $R_9$, being connected to the collector of the switch $S_2$ and the holding transister $Tr_4$ through the non-return diode $D_4$ and $D_5$ connected parallel to each other. When the switch $S_2$ is closed by the second step of the shutter button 347 the transister $Tr_5$ is brought in the switched on state so as to bring the transister $Tr_5$ into the switched on state through the resistance $R_{10}$.

By means of the switching on of the transister $Tr_4$ the base potential of the transister $Tr_5$ is kept at the low level, so that the transister $Tr_5$ is kept in the switched on state even if the switch $S_2$ is brought back into the switched off state by the returning of the button 347. $R_{14}$ and $C_3$ and the resistance and the condenser for forming the delay circuit for delaying the start of the camera during the light measuring operation especially in case of the repeated photography, whereby impedance values are adjusted in such a manner that the then time constant is more or less 10 msec. $C_2$ is the self-timer time adjusting condenser being connected parallel to the condenser $C_3$ and connected to the switch $S_7$ through the non-return diode $D_7$, $Tr_6$ and $Tr_7$ the transisters for discharging the condensers $C_2$ and $C_3$ so as to bring them into the reset state, $C_7$ the discharging time controlling condenser, and $D_6$ the non-return diode. When the charge level of the condensers $C_2$ and $C_3$ reaches a certain determined level, the control circuit $B_3$ of the exciting coil $M'_2$ operates so as to trigger the mono-stable multi-vibrator circuit $B_4$ in such a manner that rectangular shaped driving pulses are applied to the exciting coil $M'_2$. $C_8$ and the $R_{15}$ are the condenser for storing the charge for quickly exciting the exciting coil $M'_2$ and the charging resistance. The output terminal of the control circuit $B_3$ of the exciting coil $M'_2$ is connected to the base of the transister $Tr_{14}$ through the diode $D_{11}$ and the resistance $R_{27}$ in sequence. $Tr_{14}$ is the current supply control transister connected in the current supply conducter in the control circuit $B_2$ of the exciting coil $M'_1$, and at the same time the exciting coil $M'_1$ control transister which, when the control circuit $B_2$ operates, triggers the mono-stable multi-vibrator circuit $B_6$ so as to apply the rectangular shaped driving pulses to the exciting coil $M'_1$. $S_{11}$ is the auto-manual change over switch (AM change over switch) for bringing the control circuit $B_2$ into the operable state when $S_{11}$ is changed over to the side of A and into the non-operable state when $S_{11}$ is changed over to the side of M. $S_4$ is the count start switch of the shutter, $C_1$ the shutter time control condenser forming a time constant circuit together with the variable resistance $VR_6$ whose resistance value is adjusted by the shutter dial 350. $Tr_8$ and $Tr_9$ are the transisters for controlling the current supply to the exciting coil $M'_3$ control circuit $B_5$ whereby the base of the transister $T_8$ is connected to the voltage dividing point of the voltage dividing resistances $R_{16}$ and $R_{17}$ and at the same time to the collector of the transister $Tr_9$ through the diode $D_{10}$. The base of the transister $Tr_9$ being connected to the voltage dividing point of the voltage dividing resistances $R_{18}$ and $R_{19}$, when the transister $Tr_8$ is brought into the switched-on state, assuring the conductive state, the transister $Tr_9$ becomes conductive so as to lower the base level of the transister $Tr_8$ and keep the transister $Tr_8$ in the switched on state. $L_2$ is an illuminating diode being connected to the accessary shoe terminal $T_2$, being connected to the voltage detecting circuit $A_2$ connected to the main capaciter $C_{10}$ of the conventional flash light device, and illuminates by the switching on of the voltage detecting circuit $A_2$ when the charge voltage of the main capaciter $C_{10}$ of the flash light device reaches a certain determined value so as to bring the transister whose base is connected to the diode $L_2$ into the conductive state. The block $B_9$ shown in dotted line in the drawing is a circuit for producing a control signal for automatically converting the shutter time into flash light time by means of the charge termination signal from the flash light device F, whereby the collector of the transistor $Tr_{10}$ is connected to the base of the transister $Tr_{11}$. Thus the transister $Tr_{11}$ is brought into the switched on state when the transister $Tr_{10}$ is brought into the switched on state so that the resistance $R_5$ is connected in series to the condenser $C_1$. On the other hand, by the switching on of the transister $Tr_{10}$ the transisters $Tr_{12}$ and $Tr_{13}$ are brought into the switched off state so that the shutter time is adjusted to a time, for example 1/60 sec. suited for the flash light photography due to the time constant circuit consisting of the resistance $R_5$ and the condenser $C_1$. Hereby the condenser $C_9$ connected to the transister $Tr_{10}$ is intended to prevent the charge termination signal from becoming incomplete for a moment when the flash light device operates in such a manner that the returning time from the flash light photographic time to the day light is delayed, the condenser $C_9$ being charged by switching on of the transister $Tr_{10}$. $T_1$, $T_2$ and $T_3$ are respectively the terminals to be connected to the synchronization terminal $T'_1$ of the flash light device F, the automatic time change over terminal $T'_2$ and the aperture control terminal $T'_3$. The above mentioned condensers $C_2$ and $C_3$ are connected to the misoperation prevention circuit $B_7$ through the diode $D_{12}$ and to the earth through the switch $S_{13}$ and $S_{15}$. Hereby the misoperation prevention circuit $B_7$ is connected to the sliding piece of the variable resistance $VR_7$ of a series circuit consisting of the resistance $R_{30}$, the variable resistance $VR_7$ and the resistance $R_{31}$. Thus when the voltage of the current source $E_1$ becomes lower than a certain determined value, the voltage dividing level of the resistance $R_{30}$, the variable resistance $VR_7$ and the resistance $R_{31}$ becomes lower than the internal voltage level of the misoperation prevention circuit $B_7$ so as to bring the misoperation prevention circuit $B_7$ into the switched on state. In consequence the above mentioned illuminating diode becomes conductive through the resistance $R_{32}$ while the condensers $C_2$ and $C_3$ is earthed through the diode $D_{12}$. When the voltage of the current source $E_1$ is above a certain determined value, the voltage dividing level of the resistance $R_{30}$, the variable resistance $VR_7$ and the resistance $R_{31}$ becomes higher than the internal voltage level of the misoperation prevention circuit $B_7$ so as to bring the misoperation prevention circuit $B_7$ into the switched off state. In consequence the illuminating diode $L_4$ does not become conductive nor the condensers $C_2$ and $C_3$ are earthed. The variable resistance $VR_7$ is intended for the fine adjustment of the dispersion of the internal resistance of the misoperation prevention circuit $B_7$. $Tr_{15}$ is a transister which is brought into the switched off state when the misoperation prevention circuit $B_7$ is switched on, being connected in series to the synchronization contact of the flash light device F.

$S_{13}$ and $S_{14}$ are the switches which are opened when the flash light device is not mounted on the camera and which are closed when the flash light device is mounted on the camera. $S_{15}$ is the switch to be operated by means of the magnet $M_5$ in such a manner that the switch $S_{15}$ is opened when the relay $M_5$ is excited and is closed when the relay $M_5$ is not excited. Hereby the magnet $M_5$ of the relay is connected to the collector of the transister $Tr_{17}$, while the base of the transister $Tr_{17}$ is connected through the terminals $T_2$ and $T'_2$ to the voltage detecting circuit $A_2$ which is brought into the switched on state when the voltage of the main condenser $C_{10}$ becomes higher than a certain determined value. $Tr_{18}$ is the transister whose base is connected to the collector of the transister $Tr_{17}$, $L_5$ the alarm illuminating element which illuminates when the transister $Tr_{18}$ is brought into the switched on state by means of the voltage divided by the resistances $R_{34}$ and $R_{35}$ and the switch $S_{14}$ is closed, $E_2$ the current source of the flash light device F and $S_{17}$ the current source switch. $A_1$ is the oscillation voltage step-up circuit. $D_{13}$ the non-return diode connected in series to the main condenser $C_{10}$ and $C_{10}$ the main condenser.

$R_{36}$ and $R_{37}$ form a voltage dividing circuit connected in parallel to the main condenser $C_{10}$, whereby the voltage dividing circuit $A_2$ is connected to the connecting point of $R_{36}$ and $R_{37}$, while the output of the voltage dividing circuit $A_2$ is connected to $T'_2$ and the aperture control circuit $A_4$.

$R_{38}$ and $R_{39}$ are the resistance for actuating the voltage detecting circuit $A_2$ and the Zener diode as the standard voltage source. Hereby the detecting circuit consists of a differential amplifier connected to the output terminal of the bridge circuit formed by $R_{36}$–$R_{39}$ and of a switching transister connected to the output terminal of the differential amplifier. $A_3$ is the trigger circuit whose input is connected to the synchronization contact $S_8$ at the side of camera through the terminals $T'_1$ and $T_1$ and whose output is connected to the trigger terminal of the discharge tube Q and to the gate of the silicone controlled rectifying element $SCR_1$ (hereinafter called SCR).

Q is a flash tube filled with for example Xe gas, being connected in series to the main condenser $C_{10}$, while $SCR_1$ is the control SCR, being connected in series to the flash tube Q. $R_{40}$ and $R_{41}$ are the resistances for charging the condenser $C_{11}$ connected to the anode side of $SCR_2$, $SCR_2$ is the SCR for controlling the control $SCR_1$. $P_2$ is a light sensing element for the flash light device, $A_5$ the integrating circuit, $A_6$ the circuit for controlling $SCR_2$, whose output is connected to the gate of $SCR_2$.

Figure 6:
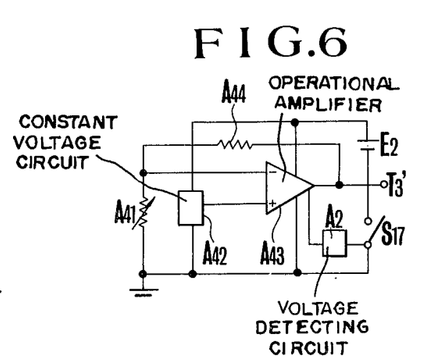
FIG. 6 shows the aperture control circuit of the exposure amount control device shown in FIG. 2, in detail.

$A_4$ is the aperture control circuit shown in FIG. 6, which is brought into the operable state when the voltage detecting circuit $A_2$ in such a manner that the output signal of the circuit $A_4$ is connected to the exposure control circuit $B_2$ at the side of camera through the terminals $T'_3$ and $T_3$ so as to put the aperture value appointed at the side of the flash light device, for example F 5.6 in case of ASA 100 into the exposure control circuit $B_2$. To explain the aperture control circuit $A_4$ in detail, the control circuit $A_4$ consists of the elements $A_{41}$–$A_{44}$ shown in FIG. 6, whereby the resistance $A_{41}$ in which the aperture information is set, is connected to the one input terminal of the operational amplifier $A_{43}$, whose other input terminal is connected to the output of the constant voltage circuit and the resistance $A_{44}$ is connected in the feed-back path. Hereby the output terminal of the above mentioned detecting circuit $A_2$ is connected to the terminal for controlling the operation and the non-operation of the amplifier $A_{43}$, while the terminal $T'_3$ is connected to the output terminal of the amplifier $A_{43}$ so as to be supplied with the aperture information.

$S_{16}$ is the switch inserted in the part connecting the information operation circuit $B_1$ with the exposure control circuit $B_2$, which switch is closed when the magnet $M_4$ of the relay is not excited and is opened when the magnet $M_4$ is excited while the magnet $M_4$ is connected to the collector of $Tr_{16}$. On the other hand, the base of $Tr_{16}$ is connected to the output terminal of the voltage detecting circuit $A_2$ of the flash light device F through the terminal $T_2$ and $T'_2$ in such a manner that, when the circuit $A_2$ is actuated, a signal is supplied to the base of the transister $Tr_{16}$ so as to bring the transister $Tr_{16}$ into the switched on state whereby the relay $M_4$ is brought into the excited state and the switch $S_{16}$ is opened.

FIG. 3 shows the montage of a flash light device on the camera shown in FIGS. 1 and 2, whereby 401 is the mounting shoe provided at the side of camera, which shoe is provided with the terminals $T_1$, $T_2$ and $T_3$ (not shown in the drawing) corresponding to the terminals $T'_1$, $T'_2$, $T'_3$ and the earth provided at the side of the flash light device F. 402 is a lever provided rotatably around the shaft 404, while 403 is a pin provided on the lever 402 serving to open and close the above mentioned switches $S_{13}$ and $S_{14}$. F is the electronic flash light device, in which the circuit explained in accordance with FIG. 2 is built, whereby 405 is the mounting foot being provided with the terminals $T'_1$, $T'_2$, $T'_3$ and the earth.

FIG. 4 shows the disposition of the display members to be displayed in the view finder at the side of camera, whereby 406 shows the view field of the finder while $L_2$, $L_4$ and $L_5$ correspond with the illuminating elements in the circuit shown in FIG. 2.

Below the operation of the above mentioned disposition will be explained, whereby at first the case with priority on shutter speed will be explained. At first the shutter dial 350 is set at the desired time. When then the AE index of the aperture ring is set at the index 302 as is shown in the drawing, the switch $S_{11}$ is changed over to the Auto-side due to the contact relation of the cam part 301b with the pin 332. When the switch $S_1$ is closed by means of the push-down of the shutter button 347, the operation circuit $B_1$ is supplied with current through the transistor $Tr_3$ in such a manner that the light sensing element P produces an electrical signal corresponding to the object brightness due to the light beam passing through the photographic lens so as to start to charge the memory condenser $C_4$. When the shutter button 347 is pushed down further the switch $S_2$ is closed. Thus the transister $Tr_5$ is brought into the switched on state while at the same time the holding transister $Tr_4$ is also brought into the switched on state so that the transister $Tr_5$ is kept in the switched on state in such a manner that the operable state is maintained by means of the transisters $Tr_4$ and $Tr_5$ even if the hand leaves the shutter button 347. In consequence current starts to be supplied to the exciting coil $M'_2$, the control circuit $B_3$, the mono-stable multivibrater circuit $B_4$ and the misoperation prevention circuit $B_7$ so as to bring them into the operable state.

When at this time the voltage of the current source $E_1$ is lower than a certain determined value, the voltage dividing level of the resistance $R_{30}$, the variable resistance $VR_7$ and the resistance $R_{31}$ is lower than the standard voltage level in the misoperation prevention circuit $B_7$, so that the misoperation prevention circuit $B_7$ is brought into the switched on state. In consequence the illuminating diode $L_4$ is supplied with current through the resistance $R_{32}$ so as to light up for indicating in the view finder that the voltage of the current source is lower than a certain determined value, while the condensers $C_2$ and $C_3$ are earthed through the diode $D_{12}$ so as to be discharged. In consequence the exciting coil $M'_2$ is not supplied with pulses any more so that the camera is not started, remaining in the non-operable state.

When at this time the voltage of the current source $E_1$ is higher than a certain determined value, the voltage dividing level of the resistance $R_{30}$, the variable resistance $VR_7$ and the resistance $R_{31}$ becomes higher than the standard voltage level in the misoperation prevention circuit $B_7$ so as to bring the misoperation prevention circuit $B_7$ into the switched off state. In consequence the illuminating diode $L_4$ is not supplied with current while the condensers $C_2$ and $C_3$ are not earthed. Thus the following operation is carried out. Due to the start of the current supply to the exciting coil $M'_2$, the control circuit $B_3$ and the mono-stable multi-vibrater circuit $B_4$ the transister $Tr_7$ is brought into the switched off state so as to start to charge the time constant circuit consisting of the condenser $C_3$, and the resistance $R_{14}$. When the charge voltage of the condenser $C_5$ reaches a certain determined level the control circuit $B_3$ of the exciting coil $M'_2$ is brought into the switched on state so that the transister $Tr_{14}$ is brought into the switched on state so as to start the current supply to the exciting coil $M'_1$ and the control circuit $B_2$ while the mono-stable multi-vibrater circuit $B_4$ is triggered. In consequence the exciting coil $M'_2$ is supplied with rectangular shaped driving pulses to the exciting coil $M'_2$ so that the magnetic force of the permanent magnet is cancelled with that of the magnet $M_2$ in such a manner that the first holding lever 313 is rotated in the clockwise direction by means of the spring 313c. Thus the one end 314a of the release lever 314 is rotated in the counter-clockwise direction against the force of the spring 314f by means of the pin 313b of the first holding lever 313. Thus the memory switch $S_3$ is opened by the pin 314c, whereby the charge voltage of the condenser $C_4$ is stored in memory while by means of the pin 314b the mirror driving engagement lever 315 is rotated as explained later in detail. By means of the counter-clockwise rotation of the release lever 314 the holding lever 316 is rotated in the counter-clockwise direction so as to solve the engagement with the secter gear 318. Further the rotation of the secter-gear 318 induces the downward movement of the signal lever 329 through the pin 318b so that the aperture preset ring 303 whose arm 303c is held by the signal lever 329 induces the clockwise rotation of the secter-gear 318 against the force of the spring 318c by means of the spring 303a. Thus the gears 319a, 319b and 319c forming the speed control mechanism 319 are rotated in such a manner that the stop wheel in the last step is rotated in the counter-clockwise direction. Further by means of the rotation of the secter gear 318 the sliding piece $VR_{51}$ of the variable resistance $VR_5$ is moved. When the value of the resistance $VR_5$ reaches a certain determined value the control circuit $B_2$ is actuated so as to trigger the mono-stable multivibrator circuit $B_6$, whereby the exciting coil $M'_1$ is supplied with pulses. Thus the magnetic force of the permanent magnet is cancelled by that of the magnet $M_2$, so that the iron piece is freed. Thus the attracted lever 330 is rotated in the counter-clockwise direction by means of the spring 331a whereby the folded part is engaged with the stop wheel 319c so as to prevent the rotation of the stop wheel 319c. Thus the position of the secter gear 318 is determined. Consequently when, as mentioned above, the rotation of the secter gear 318 is prevented, the aperture preset ring 303 is rotated up to the position corresponding to the proper aperture value and thus the position of the bell crank is determined. In other words, the position at which the aperture preset ring 303 stops corresponds to the aperture value determined by the information produced by the light sensing element P basing upon the light beam passing through the photographic lens and various other informations such as the shutter time, the film sensitivity exposure compensating informations and others.

On the other hand with the start of the AE operation, the automatic aperture mechanism also starts. Namely the first holding lever 313 is rotated in the clockwise direction by means of the spring 313c while the release lever 314 is rotated in the counter-clockwise direction whereby the end 315a of the mirror driving engagement lever 315 is rotated in the clockwise direction through the pin 314b. Namely the engagement of the one side 311c of the mirror driving lever 311 with the one end 315b of the mirror driving engagement lever 315 is solved so that by means of the spring 311d the mirror driving lever 311 is rotated in the counter-clockwise direction. At the same time, the claw 311b of the mirror driving lever 311 is held by the holding lever 336 so that the push up lever bearing the holding lever 336 is rotated in the counter-clockwise direction. In consequence the folded part 337b of the push up lever 337 is engaged with the rising up part 305c of the automatic aperture lever 305 so as to rotate the automatic aperture lever 305 in the clockwise direction. Thus by operating the pin 304 provided on the aperture driving ring the diaphragm is closed down to the position of the bell crank in which the aperture value is preset. Further by means of the counter-clockwise rotation of the push up lever 337 the push up pin 338a of the mirror 338 is pushed up so as to push up the mirror 338.

With this push up movement of the mirror 338 the delay device operates in such a manner that after the elapse of a certain time determined by the delay device the front shutterplane holding lever 333 is rotated in the clockwise direction by means of the above mentioned mirror driving lever 311. The delay time determined by the delay device is intended for starting the shutter after the elapse of the time during which the maximum aperture reaches the minimum aperture. After the elapse of the time determined by the delay device the front shutter plane gear 334 starts to rotate so as to allow the front shutter plane to run by means of the front shutter plane pinion 335. With the start of the front shutter plane the count start switch $S_4$ is opened in a conventional way while after the elapse of the time determined by the variable resistance $VR_6$ with a resistance value corresponding to the set shutter speed and the condenser $C_1$ the control circuit $B_5$ is actuated so as to trigger the mono-stable multi-vibrator $B_8$ and to apply pulses to the exciting coil $M'_3$. In this way, the magnetic force of the permanent magnet is cancelled with that of the magnet $M_5$.

In consequence the locking of the rear shutter plane gear 339 by means of the attracted lever 340 is solved so that the rear shutter plane gear 339 starts to rotate so as to allow the rear shutter plane to run by means of the rear shutter plane pinion 340. Further when the rear shutter plane has run, with the rotation of the rear shutter plane gear 339 the rear shutter plane signal lever 341 is rotated in the counter-clockwise direction by means of the pin 339a so as to rotate the mirror holding lever 336 in the clockwise direction. By means of the rotation of the mirror holding lever 336 the engagement with the mirror driving lever 311 is solved. In consequence the push up lever 337 is rotated in the clockwise direction by means of the spring 305a through the automatic aperture lever 305 whereby the mirror 338 resumes the initial position by means of the returning spring 338c. Further at the same time, the automatic aperture lever 305 is rotated in the counter-clockwise direction by means of the spring 305a in such a manner that the pin 304 provided on the aperture driving ring returns so as to restore the initial opened state. When then the winding up operation is carried out by the winding up shaft 308, the film winding up as well as the shutter charge are carried out while by means of the intermediary levers 310 and 307 the charge lever 312 is charged and the automatic aperture mechanism as well as the mirror mechanism are also charged. Thus the parts disengaged from each other by the release operation are again engaged with each other so as to restore the state shown in the drawing.

Below the case with the flash light photography will be explained. When in FIG. 3 the mounting foot 405 of the flash light device F is inserted in the mounting shoe 401 provided at the side of camera, the lever 402 is pushed by the foot 405 so as to be rotated around the shaft 404 in the counter-clockwise direction whereby the switches $S_{13}$ and $S_{14}$ are closed while the terminals $T'_1$, $T'_2$, $T'_3$ and the earth provided on the foot 405 are respectively connected to the corresponding terminals $T_1$, $T_2$, $T_3$ and the earth. When in the above mentioned mounted state in FIG. 2, the switch $S_{17}$ of the flash light device F is opened, the output voltage of the current source $E_2$ is lower than a certain determined value or the main condenser $C_{10}$ is not charged up to a certain determined value, for example, a value at which the flash tube Q is in a position to discharge, or the terminal voltage of the main condenser $C_{10}$ has not reached the determined value yet due to the repeated photographing, the voltage detecting circuit $A_2$ remains in the switched off state while the aperture control signal circuit $A_4$ remains also in the switched off state. Further the signal to be produced at the terminal $T'_2$ is also switched off so that the illuminating element $L_2$ does not become conductive whereby the transister $Tr_{10}$ is also in the switched off state so that the transister $Tr_{11}$ is also in the switched off state. On the other hand, the transisters $Tr_{12}$ and $Tr_{13}$ are in the switched on state while the time constant condenser $C_1$ for controlling the shutter time is connected to $VR_6$. In consequence the shutter time is the one determined by the variable resistance $VR_6$ set by means of the shutter dial 350 and the condenser $C_1$, namely in the state of the day light photography. Because the output signal of the terminal $T'_2$ is switched off, the transisters $Tr_{16}$ and $Tr_{17}$ are also in the switched off state. In consequence the relay magnets $M_4$ and $M_5$ are not excited whereby the switches $S_{15}$ and $S_{16}$ are closed so that the output terminal of the information operation circuit $B_1$ is connected to the exposure control circuit $B_2$ through the switch $S_{16}$.

On the other hand, the switch $S_{15}$ is closed so that the condensers $C_2$ and $C_3$ are earthed.

In consequence the condensers $C_2$ and $C_3$ are discharged through the switches $S_{13}$ and $S_{15}$. Thus the control circuit $B_3$ is brought into the non-operable state while no pulses are applied to the exciting coil $M'_2$ so that the magnet $M_2$ does not operate, the mechanism of camera does not start at all and the camera remains in the non operable state. Because at this time, the transister $Tr_{18}$ is in the switched on state because of the voltage divided by the resistances $R_{34}$ and $R_{35}$, the illuminating element $L_5$ is conductive so as to alarm that the flash light device is ready for operation.

In such a case as mentioned above, the photographer has to close the current source switch $S_{17}$ of the electronic flash device, change the current source $E_2$ for a new one or wait until the charge voltage of the main condenser $C_{10}$ reaches a certain determined value. However, all the mechanical members at the camera side have not started the operation at all so that it is not necessary to bring the mechanical members at the camera side into the initial state. After the above mentioned measures, the charge voltage of the main condenser $C_{10}$ becomes higher than a certain determined value, the voltage detecting circuit $A_2$ is brought into the switched on state by means of the voltage divided by the resistances $R_{36}$ and $R_{37}$. The one output of the voltage detecting circuit $A_2$ is put in the aperture control circuit $A_4$ while the other output is put in the illuminating element $L_2$, and the base of the transisters $Tr_{16}$ and $Tr_{17}$ through the terminals $T'_2$ and $T_2$. Thus the illuminating element $L_2$ is switched on so as to indicate that the flash light device is ready for operation while the transisters $Tr_{10}$ and $Tr_{11}$ are brought into the switched on state. When the transister $Tr_{11}$ is brought into the switched on state, the transisters $Tr_{12}$ and $Tr_{13}$ are brought into the switched off state whereby the shutter time control resistance $VR_6$ is separated from the condenser $C_1$ while the fixed resistance $R_8$ is connected to the condenser $C_1$ in such a manner that the shutter speed is adjusted to the speed such as 1/60 sec. suited for the flash light photography. Further by means of the signal that the flash light device is ready for operation applied to the base of the transisters $Tr_{16}$ and $Tr_{17}$ through the terminals $T_2$ and $T'_2$, the transisters $Tr_{16}$ and $Tr_{17}$ are brought into the switched on state, the magnets $M_3$ and $M_4$ of the relays are supplied with current and the switches $S_{15}$ and $S_{16}$ are opened. When the transister $Tr_{17}$ is brought into the switched on state, the base potential of the transister $Tr_{18}$ goes up until the transister $Tr_{18}$ enters into the cut off state whereby the lamp $L_5$ for indicating the readiness of the flash light device does not light up. When the voltage detecting circuit $A_2$ is brought into the operable state, an electrical signal is applied to the aperture control circuit $A_4$ so as to bring the aperture control circuit $A_4$ into the switched on state in such a manner that the aperture value set at the side of the flash light device such as F 5.6 at ASA 100 is put in the exposure control circuit $B_2$ through the terminals $T'_3$ and $T_3$.

Because in the exposure control circuit $B_2$ the switch $S_{16}$ is opened by means of the signal that the flash light photography is ready, the operation information in the day light photographic state is not put in the exposure control circuit $B_2$ from the information operation circuit $B_1$ whereby the exposure control circuit $B_2$ is operated by the aperture set information produced in the aperture control circuit $A_4$ of the flash light device F. When in the above mentioned state the release button 347 is pushed, the switch $S_2$ is closed in a similar way as the AE operation in case of the day light photography in such a manner that, as mentioned above, the control circuit $B_3$ and the mono-stable multi-vibrator circuit $B_4$ are brought into the switched on state, whereby the magnet $M_2$ is supplied with current so that the circuits of the camera carry out the similar operations as in case of the day light photography in such a manner that the synchronization switch $S_6$ is closed when the front shutter plane is totally opened. By means of the closure of the synchronization switch $S_8$ the transister $Tr_{15}$ is brought into the switched on state so that through the terminals $T_1$ and $T'_1$ the synchronization is put into the trigger circuit $A_3$ so as to trigger the circuit $A_3$. The above mentioned output is applied to the discharge tube Q, the trigger terminal and the gate of $SCR_1$ whereby the discharge tube Q and $SCR_1$ are switched on so as to start the operation.

The flash light reaches the object not shown in the drawing, and the light reflected by the object reaches the light sensing element $P_2$ whereby the output of the light sensing element $P_2$ is put in the integrating circuit $A_5$, which, when the input voltage reaches a certain determined value, supplies the output signal to the flash light stop control circuit $A_6$ so as to trigger the flash light stop control circuit $A_6$. $SCR_2$ is brought into the switched on state at the time point at which the signal is applied to the gate, whereby the charge stored in the condenser $C_{11}$ is applied between the anode and the cathode of the $SCR_1$ in the reversed bias direction through $SCR_2$ in such a manner that $SCR_2$ is cut off and the discharge is stopped so as to be able to obtain a proper exposure on the film plane.

On the other hand, by means of the aperture control signal $A_4$ the exposure control circuit $B_2$ operates so as to compare the aperture control signal with the information signal set by means of the variable resistance $VR_5$ shown in FIG. 1 in such a manner that when both signals are balanced the magnet $M_1$ operates so as to rotate the aperture preset ring 30 up to the position corresponding to the set aperture value as explained above. After then the aperture is obtained in the same way as the operation of the day light photography. On the other hand after the elapse of the time determined by the time constant of the above mentioned resistance RS and the condenser $C_1$ the control circuit $B_5$ is brought into the switched on state and then the monostable multi-vibrater circuit $B_8$ is brought into the switched on state, when the exciting coil $M'_3$ is supplied with current in such a manner that the magnetic force of the permanent magnet is cancelled with that of the magnet $M_3$. In consequence the locking of the rear shutter plane gear 339 by means of the attracted lever 340 is solved so that the rear shutter plane gear 339 starts to rotate, allowing the rear shutter plane to run by means of the rear shutter plane pinion 340 so as to terminate the exposure. Hereby it is possible to adopt other conventional alarm device such a buzzer instead of the above mentioned alarm illuminating element for producing an acoustic alarm.

As explained above in accordance with the present invention, when the voltage of the current source of the flash light device is insufficient, it is possible to produce alarming or prevent the operation of the shutter release mechanism of the camera so that not only it is possible to prevent the flash light photography with improper exposure in advance, avoiding the waste of the film but also there is no necessity to set the shutter mechanism or the diaphragm mechanism of the camera in the initial state at the time of starting the next flash light photography because the camera mechanism does not operate at all even if the release button is pushed down so far as the voltage of the storage capaciter of the electronic flash device is lower than a certain determined value. In consequence the operability is improved while the operation time of the camera can be much shortened so that the shutter chance is seldom lost, which is remarkably profitable. Further the magnet $M_2$ provided at the camera side is made use of as a member for locking the shutter release mechanism of the camera when the charge voltage of the storage capaciter of the flash device is lower than a certain determined value, the number of the elements can be checked small, which is also very profitable.

What is claimed is:

1. A photographic camera having a mirror, which camera is used together with an electronic flash device having a storage capacitor means, comprising:
    (a) mirror-up means for driving said mirror;
    (b) exposure control means having an electrical exposure control circuit for controlling an exposure value;
    (c) an electrical energy source for energizing the electrical exposure control circuit; and
    (d) blocking means which is associated with said mirror-up means and said exposure control means for preventing initiation of operation of said mirror-up and exposure control means and for removing said prevention to allow operation of each of said means only when both the voltage of said storage capacitor and that of said electrical energy source reach a predetermined value.

2. A photographic camera according to claim 1, wherein said storage capacitor means includes a capacitor which is connected to a flash tube of said electronic flash device and supplies electrical energy.

3. A photographic camera according to claim 1, wherein said electronic flash device includes a detecting circuit for detecting the voltage across said storage capacitor means and produces an electrical signal when the voltage of said storage capacitor means has reached a predetermined value.

4. A photographic camera according to claim 3, which further comprises a display means responsive to the electrical signal from the detecting circuit for indicating a completion of the charging of said storage capacitor means.

5. An arrangement of a camera and an electronic flash device, comprising:
    an electronic flash device including: storage capacitor, and
        first voltage detecting circuit connected to said storage capacitor for detecting voltage across said storage capacitor and for producing a first electrical signal when the voltage of said storage capacitor has reached a predetermined value; and
    a camera including:
    a swingable mirror,
    mirror driving means to drive said mirror,
    shutter control means which is functionally coupled to said mirror driving means and which commences operation after said mirror reaches a prescribed position,
    an electrical energy source for energizing the shutter control means,
    a second voltage detecting circuit connected to said electrical energy source for detecting voltage across the electrical energy source and for producing a second electrical signal when the voltage of said electrical energy source has reached a predetermined value,
    a blocking member engaged with said mirror driving means to prevent said mirror driving means from operating, and
    actuating means coupled to said blocking member to disengage the blocking member from said mirror driving means only when both said first and second electrical signals are produced.

6. The arrangement of a camera and an electronic flash device according to claim 5, in which said actuating means includes an electromagnet which is excited in response to the electrical signals from said first and second voltage detecting circuits.

7. An arrangement of a photographic camera and an electronic flash device, comprising:
    an electronic flash device including:
        a storage capacitor, and
        a first voltage detecting circuit connected to said storage capacitor for detecting voltage across said storage capacitor and for producing a first electrical signal when the voltage of said storage capacitor has reached a predetermined value; and
    a photographic camera including:
    a swingable mirror,
    mirror-up means to drive said mirror,
    shutter control means which is functionally coupled with said mirror-up means and which commences operation after said mirror has reached a prescribed position,
    a diaphragm mechanism for controlling the aperture size of a photographic taking lens of said camera, an electrical energy source for energizing the shutter control means, a second voltage detecting circuit connected to said electrical energy source for detecting voltage across the electrical energy source and for producing a second electrical signal when the voltage of said electrical energy source has reached a predetermined value, a blocking member engaged with said mirror-up means and said diaphragm mechanism to prevent them from operating, and actuating means coupled to said blocking member to disengage the blocking member in response to said first and second electrical signals when both of these signals are produced.

8. The arrangement of a photographic camera and an electronic flash device according to claim 7, in which said actuating means includes:
 (a) charge means which discharges in response to attachment of said electronic flash device to said camera and which enables charging to begin when both of said first and second electrical signals are produced;
 (b) an electromagnet magnetically coupled to said blocking member to retain said blocking member in engagement; and
 (c) driving signal producing means which deenergizes said electromagnet to release it from being coupled to said blocking member when the output signal of said charge means reaches a predetermined value.

9. The arrangement of a photographic camera and an electronic flash device according to claim 8, wherein said driving signal producing means includes:
 (a) a Schmitt trigger circuit connected to the output terminal of said charge means to produce a third signal when the output voltage of the charge means reaches a predetermined value; and
 (b) a monostable multivibrator connected between said Schmitt trigger circuit and said electromagnet to apply a pulse for deenergizing said electromagnet in response to said third signal.

* * * * *